UNITED STATES PATENT OFFICE.

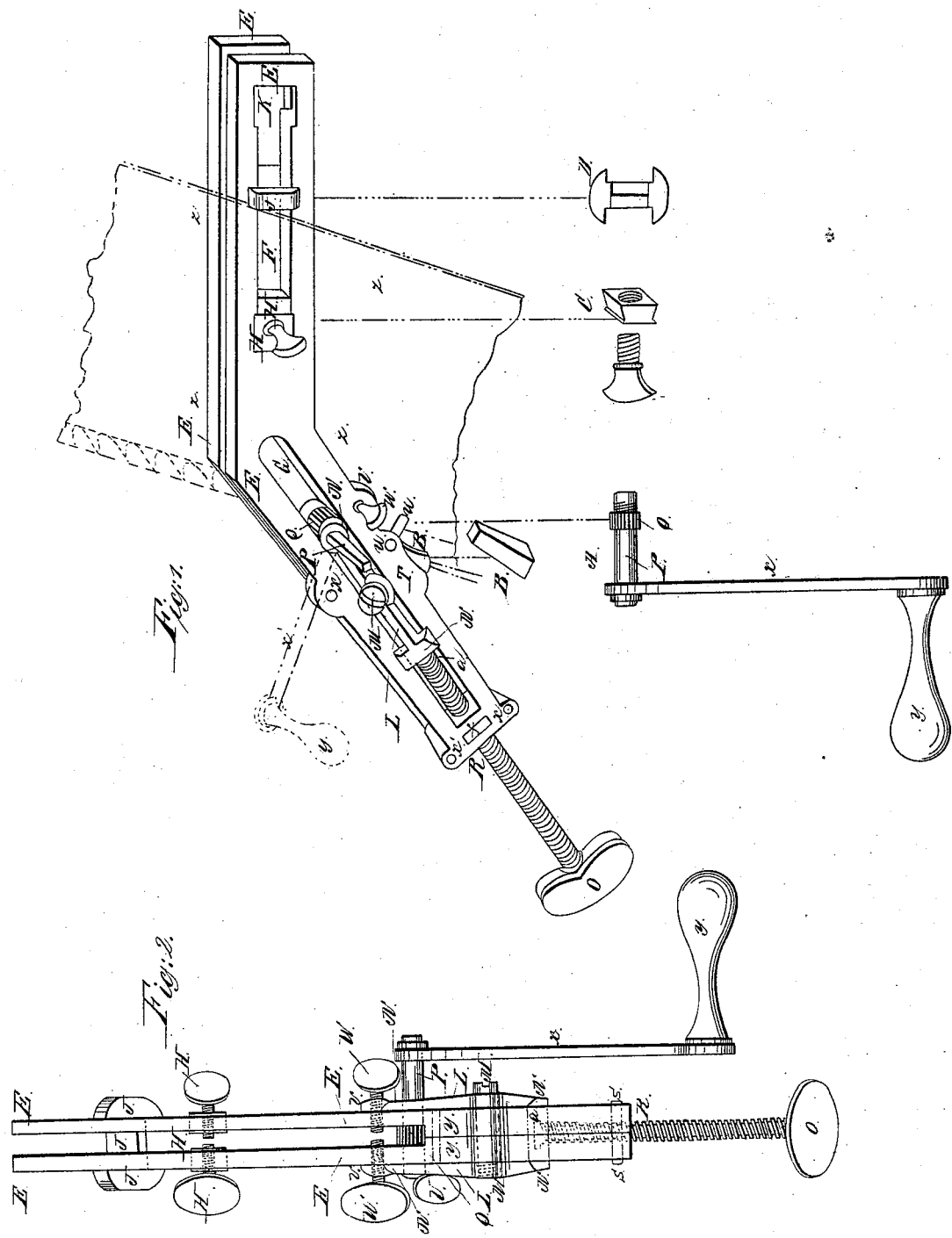
A. B. Spencer,
Saw Gummer.
N° 4,564. Patented June 6, 1846.

A. B. SPENCER, OF NEWTON, OHIO.

MACHINE FOR DRESSING SAWS.

Specification of Letters Patent No. 4,564, dated June 6, 1846.

*To all whom it may concern:*

Be it known that I, APOLLOS B. SPENCER, of Newton in the county of Trumbull and State of Ohio, have invented a new and Improved Instrument called the "Saw-Dresser"; and I do hereby declare that the following is a full and exact description.

The nature of my invention consists of an instrument, by means of which, the teeth in the blade of any saw, intended for sawmills or otherwise, may be recut or renewed with the greatest accuracy and speed.

To enable others skilled in the art to make and use my invention, I will proceed to describe its construction and operation, reference being had to the annexed drawings making a part of this specification in which—

Figure 1, is a perspective view of the saw-dresser. Fig. 2, the same when viewed from above—(A, B, C, and D) are single parts represented by themselves for better illustration, the letters used are the same as the same parts of the sawdresser in (Fig. 1 and Fig. 2.)

In Fig. 1, (E, E,) are two cast iron side pieces in the shape as represented in the drawing, the two pieces are connected together only at the head end (R) by three rivets (x, x, x,) where a small projection (y y) is cast to the inside of each of the side pieces (E E) to keep the balance of the sides apart as shown at (Fig. 2, y y,) forming a space between them to receive the saw blade. The side pieces (E, E,) are bent near the middle on the edge side, the bend being about 40 degrees from the straight line, as represented at (Fig. 1). To the flat side of the two side pieces (E, E,) are two longitudinal slits (F and G) corresponding with each other in both the side pieces, one in each bend. The slit (F) is for the saw rests or support screws (H, H,) and the die (I) to slide in, by the rests (H) and die (I) the saw blade is adjusted and kept in the proper position when in the operation of cutting the teeth. The saw rests (H, H,) and the die (I) are introduced into the slit (F) through the square opening (K) out through the beveled parts of the slit (F), as (C and D) is the saw rest (H) and the die (I) separately represented.

In the slit (G) is a movable sliding frame (L) made of two parts, and fitted together, and screwed together by the screw (M) and kept at the side pieces (E, E) by the projecting flanges (N, N, N, N,) from the outside. Between this movable sliding frame (L) before the two parts are fastened together by the screw (M), the head (a) of the long hand screw (O) is put into a cavity of the two frame parts (L) at one end, and the axle (P) of the bur (Q) is also inserted in corresponding holes at the upper end of the sliding frame (L), after which they are screwed by the screw (M) into the slit (G). The long hand screw (O) passes through the head (R) of the instrument; in the head (R) is a cross slit in which a female screw (S') is inserted, through it passes the long hand screw (O). At the lower outside, and near the middle of the slit (G) of the side (E), is made a projection (T); a square hole is made obliquely upward, and a square wedge or support (B) is inserted and kept fastened by drawing the two sides of the frame (E, E,) together by the screw (U), the wedge (B) is intended as a rest for the saw tooth below the bur (Q). A little farther to the middle of the instrument, another projection in the width of the side (E) is made to receive the thumb screws (W, W,) which passes from both sides and for the purpose to secure, between them, the saw blade (Z Z) near the bur (Q) in the operation of cutting.

(X) is the crank and (Y) the handle. The whole length of this instrument, when measured over its bent line, is eighteen inches, the width of the space between the sides (E E) is according to the thickness of the saw blade intended to be cast.

The bur (Q) is made in form of a female screw and fitted to the axle (P) by the screw as represented at (A), but the bur (Q) may be made in one piece with the axle (P) if desired.

Fig. 2, is already illustrated in describing (Fig. 1).

The operation is as follows: The movable sliding frame (L) is drawn by the long screw (O) back, toward the head (R). The sawblade introduced at (Z Z) between the side pieces (E E) adjusted in the proper position and direction, and then fastened from both sides by the rest-screws (H H) and the screws (W, W,) the die (I) is drawn behind the blade, which is now ready for cutting. The hand screw (O) is put in motion until the bur (Q) touches the saw blade. The crank (X) is now put in quick motion by the handle (Y) and at the same time, the hand screw (O) is kept also in a slow forward motion, by which the bur (Q) is advanced upon the saw blade which will cut and form the desired tooth into the blade to any desired depth. After which the hand screw (O) is screwed back against the head (R), the screws (H H) and (W, W) released, the saw blade set again in a new and proper position for another tooth, and the operation renewed as before described till all the teeth of the saw blade are cut or formed as required. By said saw dresser, a new saw blade which had no teeth was cut by the inventor the whole length in the short time of one half of an hour, in a perfect manner, which could not be superseded in any other mode of cutting saw teeth, than in the manner invented by me.

What I claim as my invention, and desire to secure by Letters Patent is—

The combination of the bur (Q) guided and operated as herein described, with the movable rest or die (I) on which the saw rests when cut, and the sliding fastening (H, H), for the purpose and use as a saw dresser as described in the specification and illustrated in the drawings.

A. B. SPENCER.

Witnesses:
 PETER VON SCHMIDT.
 T. C. DONN.